United States Patent [19]

Hulsing, II et al.

[11] Patent Number: 4,881,408
[45] Date of Patent: Nov. 21, 1989

[54] LOW PROFILE ACCELEROMETER

[75] Inventors: Rand H. Hulsing, II, Redmond; Rex B. Peters, Woodinville; Brian L. Norling, Mill Creek, all of Wash.

[73] Assignee: Sundstrand Data Control, Inc., Redmond, Wash.

[21] Appl. No.: 313,289

[22] Filed: Feb. 16, 1989

Related U.S. Application Data

[63] Continuation of Ser. No. 28,591, Mar. 20, 1987, abandoned.

[51] Int. Cl.$^4$ .............................................. G01P 15/10
[52] U.S. Cl. .................................................. 73/517 AV
[58] Field of Search ......... 73/516 R, 517 R, 517 AV, 73/651, 862.59, DIG. 1, DIG. 4; 310/329

[56] References Cited

U.S. PATENT DOCUMENTS

| | | | |
|---|---|---|---|
| 3,033,043 | 5/1962 | Runft | 73/517 AV |
| 3,351,880 | 11/1967 | Wilner | 73/517 R |
| 4,215,570 | 8/1980 | Eer Nisse | 73/DIG. 4 |
| 4,244,225 | 1/1981 | Greenwood | 73/DIG. 1 |
| 4,479,385 | 10/1984 | Koehler | 73/517 AV |
| 4,517,841 | 5/1985 | Peters et al. | 73/517 AV |
| 4,751,849 | 6/1988 | Paros et al. | 73/862.59 |

FOREIGN PATENT DOCUMENTS

| | | | |
|---|---|---|---|
| 794546 | 1/1981 | U.S.S.R. | 73/517 AV |
| 2121953 | 1/1984 | United Kingdom. | |
| 2152314 | 1/1986 | United Kingdom. | |

Primary Examiner—John Chapman
Attorney, Agent, or Firm—Michael S. Yatsko; Trevor B. Joike

[57] ABSTRACT

A compact, low g range accelerometer comprising a support (22), a proof mass (20), flexures (24, 26) for mounting the proof mass to the support, and a force sensing element (40). The proof mass has a single rotational degree of freedom about a hinge axis (H) perpendicular to the accelerometer's sensitive axis (S). The force sensing element is positioned along a line that is normal to the hinge axis and that lies in a plane that is normal to the hinge axis and that passes through the center of gravity (46) of the proof mass. The perpendicular distance between the hinge axis and the force sensing element is less than the distance between the hinge axis and the center of the proof mass. The force sensing element may be parallel to the pendulous axis, to produce an extremely compact accelerometer, or may be oriented at an acute angle with respect to the pendulous axis, such that the line along which the force sensing element is positioned passes through the center of percussion of the proof mass.

7 Claims, 3 Drawing Sheets

LOW PROFILE ACCELEROMETER

This application is a continuation application based on prior copending application Ser. No. 028,591, filed on Mar. 20, 1987, now abandoned.

FIELD OF THE INVENTION

The present invention relates to accelerometers, and in particular to compact accelerometers using vibrating beam force transducers.

BACKGROUND OF THE INVENTION

Various forms of accelerometers have been built using an analog force rebalance principle. Analog accelerometers have the associated inaccuracies of conversion of an analog signal into a digital signal for computer usage. In particular, analog-to-digital converters suffer resolution and aliasing problems, and voltage-to-frequency converters suffer bias, scale factors and sometimes quantization inaccuracies. Some directly digital compatible accelerometers have been built using single and dual beam resonating elements. The single beam accelerometers require difficult crystal isolation techniques. A dual beam resonating element design substantially overcomes the isolation problem. However, both size and g range have been large with conventional vibrating beam accelerometers, such accelerometers typically being one cubic inch in size for a g range of 40–120. A smaller volume, of about 0.25 cubic inches is desirable in a low g range (±4 g) accelerometer.

One approach to a small vibrating beam accelerometer is shown in U.S. Pat. No. 4,479,385. This patent describes an accelerometer consisting of two resonator members and a spacer mass. As the pendulum of the accelerometer bends, the strain in each element is used to change the resonant frequency of the beams. This configuration has the advantage of small size, and of adjustable g range by changing the mass and/or spacer thickness. However, it does suffer from several disadvantages. In particular, it has sensitivity to accelerometer along both transverse axes, although such sensitivity is typically attenuated 50–100 times. Furthermore, the dual beam arrangement will cross-couple frequency and then "lock-in" for some range of mid-band frequencies. The accelerometer as shown has no form of damping, and so will resonate at some natural frequency of acceleration input with an unacceptably high Q.

SUMMARY OF THE INVENTION

The present invention provides a compact accelerometer having a low g range that can be conveniently adjusted by simple alterations to the geometry of the device. The accelerometer does not suffer from many of the disadvantages associated with prior low g range accelerometers, such as cross-coupling, lock-in and unwanted resonance.

In one preferred embodiment, the accelerometer comprises a support, a proof mass, mounting means for mounting the proof mass to the support and force sensing means. The mounting means mounts the proof mass such that the proof mass has a rotational degree of freedom about a hinge axis perpendicular to the accelerometer's sensitive axis. The force sensing means comprises one or more force sensing elements, each connected between the proof mass and the support. The force sensing means and the mounting means are the only constraints on rotation of the proof mass about the hinge axis. Each force sensing element is positioned along a line that is normal to the hinge axis, the perpendicular distance between the hinge axis and each line being less than the distance between the hinge axis and the center of mass of the proof mass. The force sensing means is symmetrically positioned with respect to a plane that is normal to the hinge axis and that passes through the center of mass of the proof mass, and all force sensing elements are connected between the proof mass and support such that rotation of the proof mass in a given direction about the hinge axis puts all force sensing elements in tension or compression. In one preferred embodiment, only a single force sensing element is used, the force sensing element lying in such plane.

A pendulous axis may be defined for the accelerometer as an axis passing through the center of mass of the proof mass and the hinge axis, and normal to the hinge axis. The force sensing element may be parallel to the pendulous axis, to produce an extremely compact accelerometer, or may be oriented at an acute angle with respect to the pendulous axis, such that the line along which the force sensing element is positioned passes through the center of percussion of the proof mass.

DETAILED DESCRIPTION OF THE INVENTION

Figure 1:
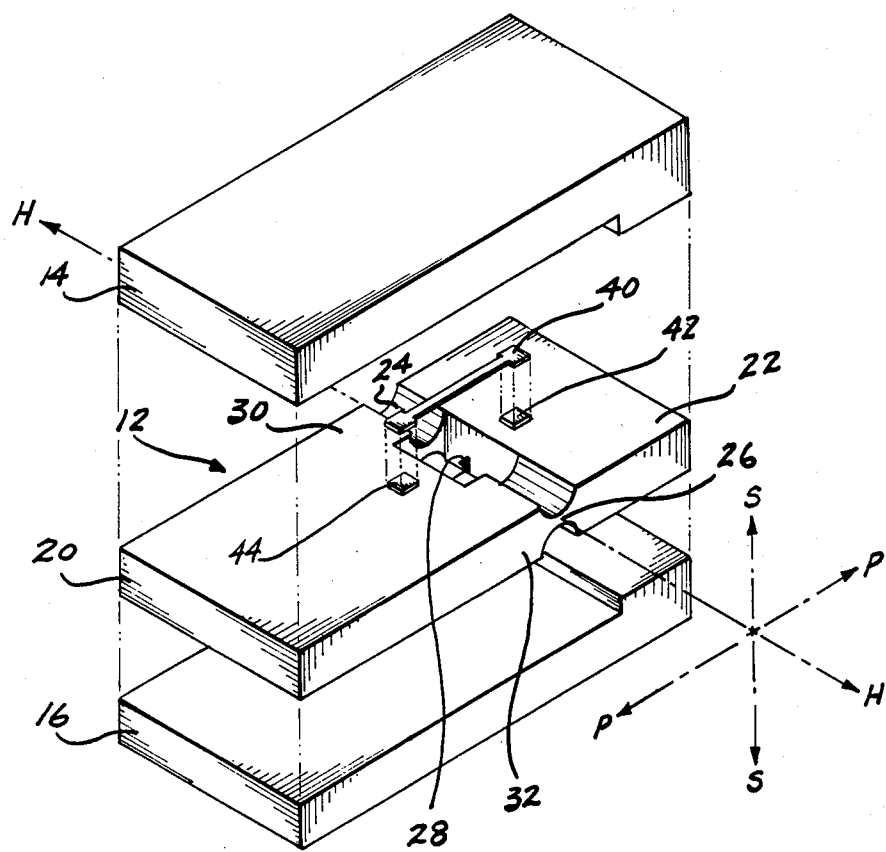
FIG. 1 is an exploded, perspective view of one embodiment of the accelerometer of the present invention.
Figure 2:
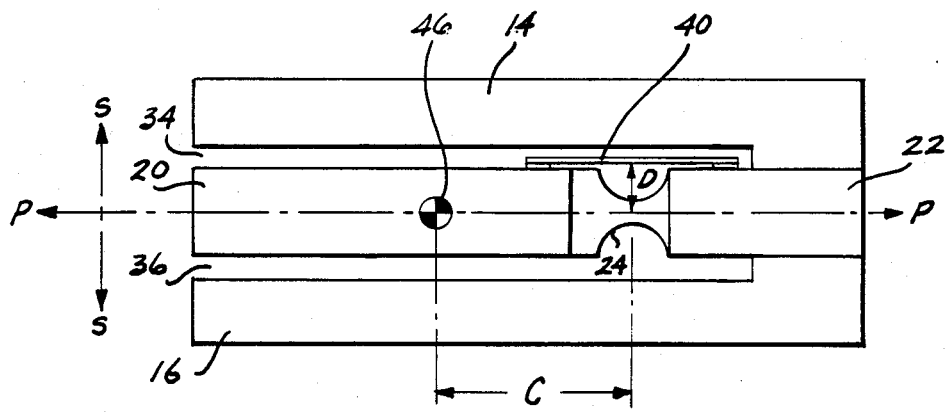
FIG. 2 is a cross-sectional view of the embodiment of FIG. 1.

One preferred embodiment of an accelerometer according to the present invention is shown in FIGS. 1 and 2. The accelerometer comprises proof mass assembly 12, upper plate 14 and lower plate 16, these elements being shown in an exploded view in FIG. 1 and in an assembled arrangement in FIG. 2. Proof mass assembly 12 comprises proof mass 20 and support 22 connected to one another by a pair of circular arc flexures 24 and 26. The proof mass includes a pair of arms 30 and 32 that extend toward and are connected to the respective flexures. As shown in FIG. 2, the heights and thicknesses of proof mass 20 and support 22 are preferably equal to one another. A portion of the lower surface of upper plate 14, i.e., the surface of upper plate 14 facing proof mass assembly 12, is cut away, such that when the upper and lower plates and the proof mass assembly are assembled in sandwich fashion as shown in FIG. 2, there is a gap 34 between the upper plate and the upper surface of proof mass 20. The upper surface of lower plate 16 is similarly cut away, to form gap 36 between the lower plate and the lower surface of proof mass 20. Force sensing element 40, preferably of the dual vibrating beam type, is connected between mounting pad 42 on support 22 and mounting pad 44 on proof mass 20, and extends approximately across the diameter of the upper circle partially defined by the circular arc flexures.

Flexures 24 and 26 define a hinge axis H about which proof mass 20 has a single, rotational degree of freedom. Pendulous axis P is an axis that is normal to hinge axis H and that passes through the center of the mass 46 of proof mass 20 when the proof mass is in its null position, as shown in FIG. 2. The accelerometer's sensitive axis S is normal to the hinge and pendulous axes, and is the axis along which the proof mass moves for small displacements from its null position.

As shown in FIG. 2, force sensing element 40 is aligned parallel with pendulous axis P, and spaced from the pendulous axis by a perpendicular distance D. In accordance with the present invention, the distance D is smaller than the distance C between the hinge axis and center of mass 46 of the proof mass. In contrast, in a conventional accelerometer of the general type shown in FIG. 2, the force sensing element would typically be connected between the end of proof mass furthest form the flexures and the adjacent point on the upper or lower plate. By making the distance D smaller than the distance C, as in the present invention, the force produced across the force sensing element by acceleration of proof mass 20 along sensitive axis S is leveraged or increased by an amount proportional to the ratio between distances C and D. The result of this force multiplying arrangement and of the configuration shown in FIGS. 1 and 2 is an extremely compact low g range accelerometer.

The use of the leveraged design shown in FIG. 2 in combination with damping gaps 34 and 36 provides a synergistic effect. Damping gaps are typically of the order of 0.001 inches for reasons of producibility and practical levels of cleanliness. Caging of the brittle force sensing crystals, on the other hand, requires that their travel be restricted to the order of 0.0001 inches, to avoid breakage under overload. Use of leveraging not only makes the proof mass smaller and the sensor more compact, but it also increases the motion of the pendulum, so that the clearances for damping and those for caging are similar. As a result, a single, easily produced gap, formed by lapping, etching, shimming, etc., can serve both damping and shock protection functions.

The flexures used in the present invention should be of the type that tend to pivot around a point, such as the illustrated circular arc flexures. Although flat beam type flexures can be used, such flexures have a tendency to S-bend and disrupt the force measurement. The circular arc flexures support the proof mass in the cross-axis directions, to greatly eliminate cross-axis acceleration coupling. The flexures also support the proof mass to greatly reduce sensitivity along the pendulous axis. The large surface areas of the proof mass and plates surrounding gaps 34 and 36 provide large surface areas for use with gas or fluid damping. As described above, gaps 34 and 36 also provide limited travel that protects the force sensing element from excessive extension or compression. Thus, the accelerometer can take high shock loads along any axis without damaging the force sensing elements.

Force sensing element 40 is preferably fabricated from crystalline quartz, while proof mass 20 and support 22 are preferably fabricated from a metal such as beryllium-copper. As a result, there is a difference between the thermal expansion coefficients of the force sensing element and the structure to which it is attached. Thus as the temperature changes, the force sensing element tends to rotate the proof mass about the hinge axis, a tendency that is resisted by the flexure hinges. The result is a temperature dependent bias term in the accelerometer output. With thermal modeling, however, this error can be reduced to acceptable levels. However were a second force sensing element to be added on the opposite side of the flexures from force sensing element 40, the ability of the flexures to accommodate the thermal coefficient mismatch would be eliminated. In general, the thermal coefficients must be matched to within 1 part per million per degree C., to avoid large locked in stresses that use up part of the resonator's useful range, cause scale factor errors due to inherent nonlinearity of the resonators, and premote instability due to creep in the resonator to substrate bond. These effects are minimized in the present invention, wherein only a single force sensing element 40 is used. It would, however, be possible to use a plurality of force sensing elements, provided they were positioned such that for a given temperature change, all force sensing elements tended to rotate the proof mass in the same direction. For example, a pair of force sensing elements could be used above each flexure 24 and 26, provided that they were positioned symmetrically with respect to the plane containing pendulous axis P and sensitive axis S. However, the use of a single force sensing element, such as shown in FIGS. 1 and 2, eliminates the possibility of cross-talk between sensors, and is preferred.

Figure 3:
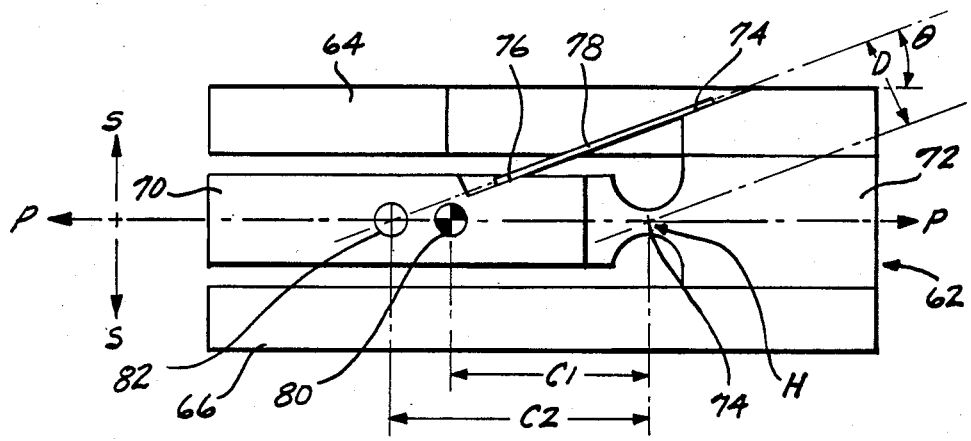
FIG. 3 is a cross-sectional view of a second preferred embodiment of the accelerometer of the present invention.

Although the force sensing element should lie in a plane perpendicular to the hinge axis, it is not required that the force sensing element be parallel to pendulous axis P. A nonparallel embodiment is illustrated in FIG. 3. This embodiment includes proof mass assembly 62 sandwiched between upper plate 64 and lower plate 66. Proof mass assembly 62 includes proof mass 70 and support 72 connected by one or more circular arc flexures 74 that define hinge axis H. Proof mass 70 has a center of mass 80 located at a distance $C_1$ from the hinge axis, and a center of percussion 82 located at a greater distance $C_2$ from the hinge axis. In this embodiment, upper plate 64 and proof mass 70 include sloping mounting shelves 74 and 76 respectively, for mounting force sensing element 78 between the upper plate and the proof mass. As a result, force sensing element 78 is aligned at an angle $\theta$ with respect to pendulous axis P and lies at a perpendicular distance D from hinge axis H. As in the embodiment of FIGS. 1 and 2, distance D is less than distance $C_1$ between center of mass 80 and proof mass 70 and hinge axis H.

As described in U.S. Pat. No. 4,517,841, there is an advantage, in a pendulous accelerometer, of mounting a force sensing element such that it is situated along a line that passes through the center of percussion of the proof mass. The center of percussion is the point at which a force parallel to the sensitive axis would produce a pure rotation about the hinge axis. The distance between center of percussion 82 and hinge axis H, designated by $C_2$, will be greater than the distance $C_1$ for all accelerometers of the type considered herein. Thus by suitable selection of the angle $\theta$, force sensing element 78 can be positioned such that it is located along a line that passes through center of percussion 82. In particular, this angle should be selected such that $\sin \theta$ is equal to $D/C_2$. As with the accelerometer of FIGS. 1 and 2, the scale factor and g range of the accelerometer may be conveniently selected by varying the distance D.

Figure 4:
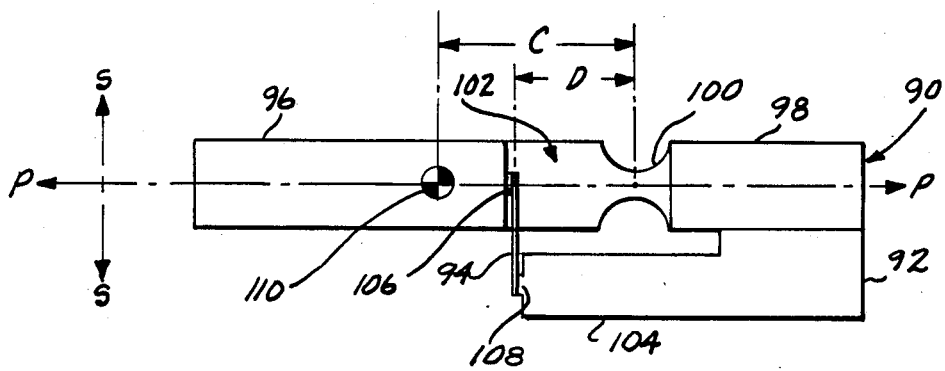
FIG. 4 is a cross-sectional view of a third preferred embodiment of the accelerometer; and, FIG. 5 is a schematic view of the accelerometer of FIG. 1.

A third preferred embodiment of the accelerometer of the present invention is illustrated in FIG. 4. This embodiment includes proof mass assembly 90, mounting element 92 and force sensing element 94. The proof mass 96 and support 98 are interconnected by one or more circular arc flexures 100. Proof mass 96 includes a central cut away area 102 that may be similar to cut away area 28 in the embodiment of FIGS. 1 and 2. Mounting structure 92 is secured to one side of support 98, and includes arm 104 that extends parallel to pendulous axis P. Force sensing element 94 extends from first mounting pad 106 on the inner face of proof mass 96, to mounting pad 108 on the distal end arm 104. As with the previously described embodiments, the distance D between the force sensing element and the hinge axis is less than the distance C between the hinge axis and center of mass 110 of proof mass 96. As a result, the desired force leverage effect is achieved. However, the embodiment of FIG. 4 has the disadvantage that it is not as physically compact as the embodiments of FIGS. 1–4.

Figure 5:
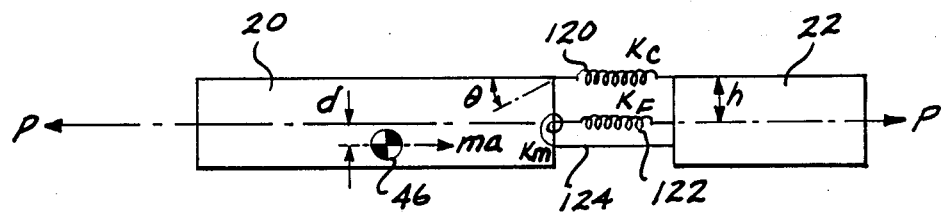

In certain embodiments of the present invention, it may be desirable to offset the center of mass of the proof mass to one side of a plane that is perpendicular to the sensitive axis and that contains the hinge axis. The reason for this offset may be described with respect to FIG. 5. The basis for the offset is that although an ideal flexure will not permit any movement of the proof mass along the pendulous axis in response to an acceleration along such axis, real flexures do permit a small amount of such movement. When such movement occurs, a force will be applied to the force sensing crystal, causing an erroneous output signal when related to acceleration along the sensitive axis. FIG. 5 presents a model of the embodiment of FIG. 1, with reference numerals 20 and 22 again referring to the proof mass and support respectively. The force sensing element is represented by spring element 120 having spring constant $k_c$, while the flexures are represented by springs 122 and 124. Spring 122 has spring constant $k_f$, and represents the susceptibility of the flexures to extension and compression. Spring 124 has spring constant $k_m$, and represents the rotational stiffness of the flexures. The center of mass of proof mass 20 is again represented by reference numeral 46, although in this case it is offset by a distance d from pendulous axis P.

Assuming that an acceleration induced force ma acts at center of mass 46 in the indicated direction, and that the resulting angular and translational movements of proof mass 20 from its null position are represented by the angle $\theta$ and the distance x respectively, the following equations may be written:

$$ma = k_f x \quad (1)$$

$$mad = k_m \theta \quad (2)$$

$$\theta = x/h \quad (3)$$

Equations (1)–(3) may be combined to yield:

$$d = k_m/k_f h \quad (4)$$

For a flat flexure having length l, thickness t and width w, $$k_f wtE/l \quad (5)$$

$$k_m Ewt^3/12(l) \quad (6)$$

Substituting Equation (5) and (6) in Equation (4), one finds that:

$$d = t^2/12h \quad (7)$$

For many applications, the resulting distance d will be very small, and can be ignored. However, the offset determined by Equation (7) may be required in certain critical applications.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. An accelerometer for measuring acceleration along a sensitive axis, the accelerometer comprising:

a support;

a proof mass, the proof mass and the support having a coefficient of thermal expansion different from the coefficient of thermal expansion of crystalline quartz;

mounting means for mounting the proof mass to the support such that the proof mass has a rotational degree of freedom about a hinge axis perpendicular to the sensitive axis;

force sensing means comprising one or more force sensing elements, each force sensing element comprising a vibrating beam transducer having a beam consisting essentially of crystalline quartz, each force sensing element being connected between the proof mass and the support, each force sensing element being positioned along a line that is parallel to a pendulous axis defined as an axis normal to the hinge axis and passing through the hinge axis and the center of mass of the proof mass, the force sensing means being symmetrically positioned with respect to a plane that is normal to the hinge axis and that passes through the center of mass of the proof mass, all force sensing elements being connected between the proof mass and support such that rotation of the proof mass in a given direction about the hinge axis puts all force sensing elements in tension or all forces sensing elements in compression, the force sensing means and the mounting means being the only constraints on rotation of the proof mass about the hinge axis; and the perpendicular distance between the hinge axis and each line being less than the distance between the hinge axis and the center of mass of the proof mass.

2. The accelerometer of claim 1, wherein the force sensing means comprises only a single force sensing element, the force sensing element lying in said plane.

3. The accelerometer of claim 2, wherein the mounting means comprises a circular arc flexure having a profile defining a portion of a circle, and wherein the force sensing element is positioned approximately as a diameter of said circle.

4. The accelerometer of claim 3, wherein the force sensing element comprises a quartz crystal in the form of a double ended tuning fork.

5. The accelerometer of claim 1, wherein the proof mass has upper and lower proof mass surfaces that are substantially normal to the sensitive axis, and wherein the support further comprises upper and lower plates positioned on opposite sides of the proof mass adjacent to but spaced apart from the respective upper and lower surfaces by gaps, the gaps being dimensioned such that the upper and lower plates function to form damping gaps and to restrict the travel of the proof mass to prevent breakage of the force sensing elements under an overload.

6. The accelerometer of claim 1, wherein the support and proof mass comprise beryllium-copper.

7. An accelerometer for measuring acceleration along a sensitive axis, the accelerometer comprising:

a support;

a proof mass;

mounting means for mounting the proof mass to the support such that the proof mass has a rotational degree of freedom about a hinge axis perpendicular to the sensitive axis;

force sensing means comprising a force sensing element connected between the proof mass and the support, the force sensing element being positioned along aline that lies in a plane that is normal to the hinge axis and that passes through the center of mass of the proof mass, the line, when extended, passing through the center of percussion of the proof mass and forming an acute angle with a pendulous axis defined as an axis lying in said plane and passing through the hinge axis and the center of mass of the proof mass; and the perpendicular distance between the hinge axis and said line being less than the distance between the hinge axis and the center of mass of the proof mass.

* * * * *